(12) United States Patent
Denovich et al.

(10) Patent No.: US 7,220,145 B2
(45) Date of Patent: May 22, 2007

(54) PATCH PANEL SYSTEM

(75) Inventors: Sam Denovich, Harrisburg, PA (US); James Joseph Eberle, Jr., Hummelstown, PA (US); Michael Patrick Green, Mechanicsburg, PA (US); John Carey Hoffer, Harrisburg, PA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 10/823,937

(22) Filed: Apr. 14, 2004

(65) Prior Publication Data

US 2005/0233635 A1    Oct. 20, 2005

(51) Int. Cl.
*H01R 13/60* (2006.01)
(52) U.S. Cl. ................................... 439/540.1
(58) Field of Classification Search ............. 439/540.1, 439/718, 532, 557, 534; 361/827, 829; 385/135, 385/53
See application file for complete search history.

(56) References Cited

U.S. PATENT DOCUMENTS

| | | | |
|---|---|---|---|
| 4,150,867 A | * | 4/1979 | Knickerbocker ............ 439/402 |
| 4,384,172 A | | 5/1983 | Knickerbocker et al. ..... 179/98 |
| 4,747,020 A | * | 5/1988 | Brickley et al. ............. 361/827 |
| 5,011,257 A | * | 4/1991 | Wettengel et al. ............ 385/53 |
| 5,129,842 A | * | 7/1992 | Morgan et al. ............. 439/532 |
| 5,734,776 A | | 3/1998 | Puetz |
| 6,504,986 B1 | * | 1/2003 | Wambeke et al. .......... 385/134 |
| 6,537,106 B1 | | 3/2003 | Follingstad |
| 6,565,260 B2 | * | 5/2003 | Belaidi et al. ................. 385/53 |
| 6,600,106 B2 | | 7/2003 | Standish et al. |
| 6,623,278 B2 | * | 9/2003 | Follingstad et al. .......... 439/64 |
| 6,633,717 B1 | * | 10/2003 | Knight et al. ................ 385/135 |
| 6,866,541 B2 | | 3/2005 | Barker et al. |
| 6,918,786 B2 | | 7/2005 | Barker et al. |
| 6,981,893 B2 | | 1/2006 | Barker et al. |
| 2005/0041947 A1 | | 2/2005 | Barker et al. |

FOREIGN PATENT DOCUMENTS

| | | |
|---|---|---|
| DE | 199 47 085 A1 | 4/2001 |
| EP | 0 179 750 A2 | 4/1986 |
| EP | 0 943 944 | 9/1999 |
| EP | 1 280 363 A2 | 1/2003 |
| WO | WO 00/52504 | 9/2000 |
| WO | WO 01/43454 A2 | 6/2001 |

* cited by examiner

Primary Examiner—Alexander Gilman

(57) ABSTRACT

A patch panel system is provided that comprises a frame, a patch panel and connector ports. The patch panel is attached to the frame and has first and second connectivity interfaces. The first connectivity interface has multiple sections joined to form an N-sided portion of a polygon where N is greater than 2. The connector ports are provided at the first connectivity interface. The sections of the first connectivity interface have planar front surfaces that are oriented at obtuse angles to one another.

24 Claims, 9 Drawing Sheets

PATCH PANEL SYSTEM

BACKGROUND OF THE INVENTION

The present invention generally relates to a patch panel system for interconnecting electronics or fiber optic cables and more specifically to a patch panel system having a space efficient geometry.

Numerous patch panel systems exist today and are used in various electronics equipment applications, such as telecommunications, data transmission, networking, video and the like. Typically, to install a patch panel system, a rack frame is securely mounted to the floor within the room in which the system is to be maintained. Multiple patch panels or boxes are then secured to the frame in a stacked arrangement. Each patch panel includes multiple connector ports (e.g. RJ45 connector ports) along the front face thereof. Each connector port is adapted to receive a plug on a mating cable that conveys a single data stream, such as for an individual user and the like.

Conventional patch panels are generally constructed with a rectangular or square horizontal cross sectional geometry or footprint. Each patch panel includes a planar front face. When the patch panels are mounted within the frame, the front faces align with one another in a vertical plane. The patch panels have a height in the vertical direction and a width in the lateral direction. The number of patch panels that are vertically stacked upon one another and the width of the individual patch panels determine the outer dimensions of a connectivity interface within which individual connector ports are retained and arranged in a desired pattern.

As information technology evolves and advances, the need increases for each patch panel system to support more and more individual users. As the number of users increases so does the need for more connector ports and cables which increases the overall physical size. To add capacity at the connectivity interface, the front face is expanded vertically by stacking additional patch panels upon one another. Alternatively or in addition, the connectivity interface is expanded laterally by increasing the width of each patch panel.

However, patch panel systems are reaching the size limits afforded by certain standards and/or by physical constraints of rooms and environments in which the patch panel systems are mounted.

A need remains for an improved patch panel system having a more space efficient geometry along the front face of the patch panels.

BRIEF DESCRIPTION OF THE INVENTION

A patch panel system is provided that comprises a frame, a patch panel and connector ports. The patch panel is attached to the frame and has first and second connectivity interfaces. The first connectivity interface has multiple sections joined to form an N-sided portion of a polygon where N is greater than 2. The connector ports are provided at the first connectivity interface.

The multiple sections of the first connectivity interface may have individual planar front surfaces and may be formed integrally with one another along a substantially arcuate path. At least one of the multiple sections includes a plurality of the connector ports which may be arranged in a matrix or array. The connector ports may be configured to convey multiple data streams or individual data streams associated with multiple or single information sources/destinations, respectively. Optionally, the first connectivity interface may be comprised of connector ports configured to convey single data streams, while the second connectivity interface includes multiport connectors which are configured to convey multiple data streams through each connector port.

Each patch panel may include one or more circuit boards containing individual communications paths (e.g. traces or lead frames) that individually join to corresponding connector ports and convey data streams between the first and second connectivity interfaces.

In accordance with an alternative embodiment, a patch panel is provided having a body with first and second connectivity interfaces provided on the body. The first connectivity interface has multiple sections joined to form an N-sided polygon where N is greater than 2. Connector ports are provided on the first connectivity interface. The body may include a base and front, back and side walls having a wedge shape. The front and back walls define the first and second connectivity interfaces respectively.

DETAILED DESCRIPTION OF THE INVENTION

Figure 1:
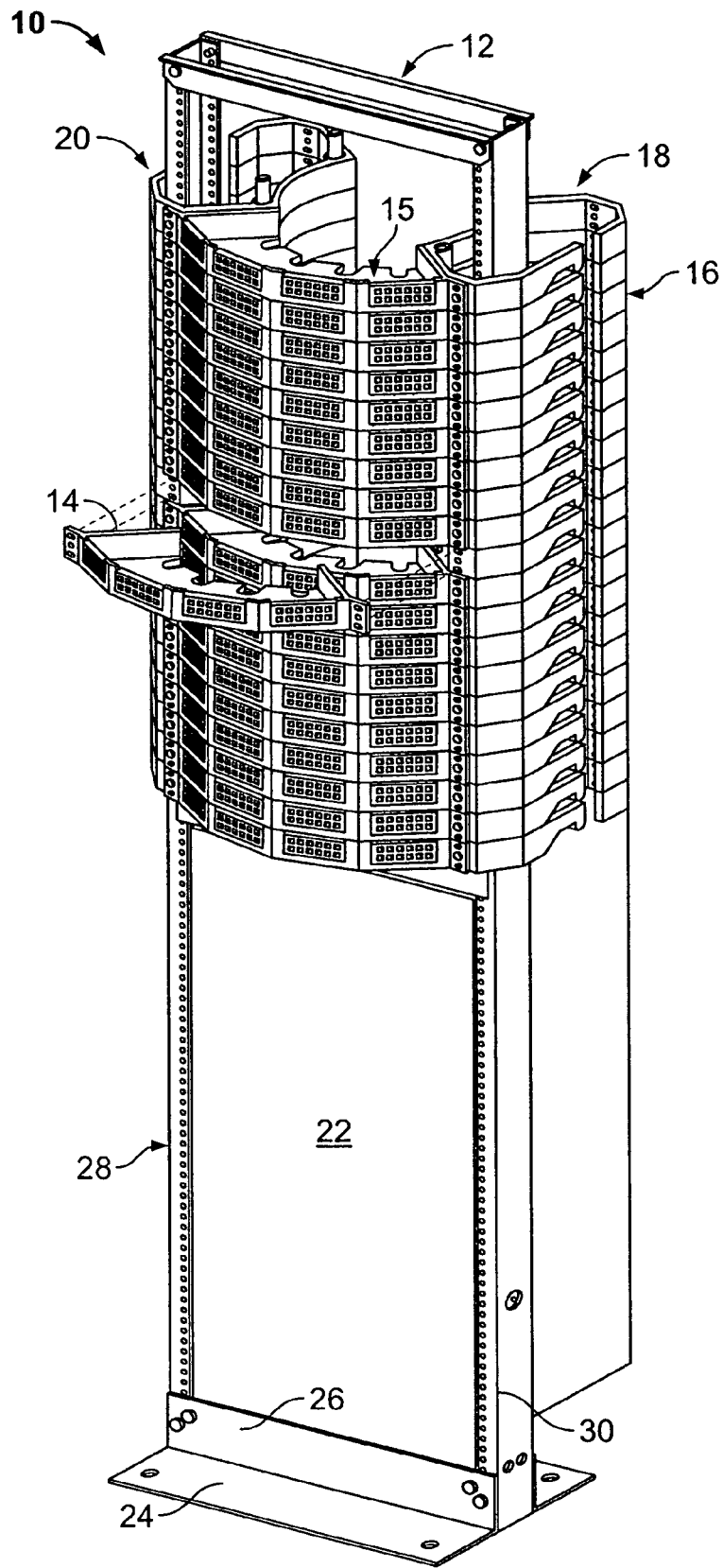
FIG. 1 illustrates an isometric view of a cable management system formed in accordance with an embodiment of the present invention.

FIG. 1 illustrates a cable management system 10 formed in accordance with an embodiment of the present invention. The cable management system 10 includes a frame 12 that is configured to be mounted to the floor and/or ceiling of an applications room. A plurality of patch panels 14 are arranged in a manner stacked upon one another forming a distribution assembly 15. The patch panels 14 are securely attached to the frame 12. A plurality of wire managers 16 are also stacked upon one another and arranged in first and second groups on opposite sides of the patch panels 14 forming wire manager modules 18 and 20. The frame 12 extends upward through each of the wire managers 16 and is securely attached to each wire manager 16 and to each patch panel 14 in a manner explained below in more detail.

The frame 12 includes a base plate 24 having an upper flange 26 that is joined to support brackets 28 and 30.

An equipment system 22 (such as a switching network) is also shown in FIG. 1, although the system 22 may be entirely removed or may be located in a different location. The system 22 is not considered part of the cable management system 10.

The patch panels 14 and wire managers 16 are arranged in a non-orthogonal relationship to one another. The term "non-orthogonal", as used throughout, shall include any non-parallel or non-perpendicular angle or geometry.

Figure 2:
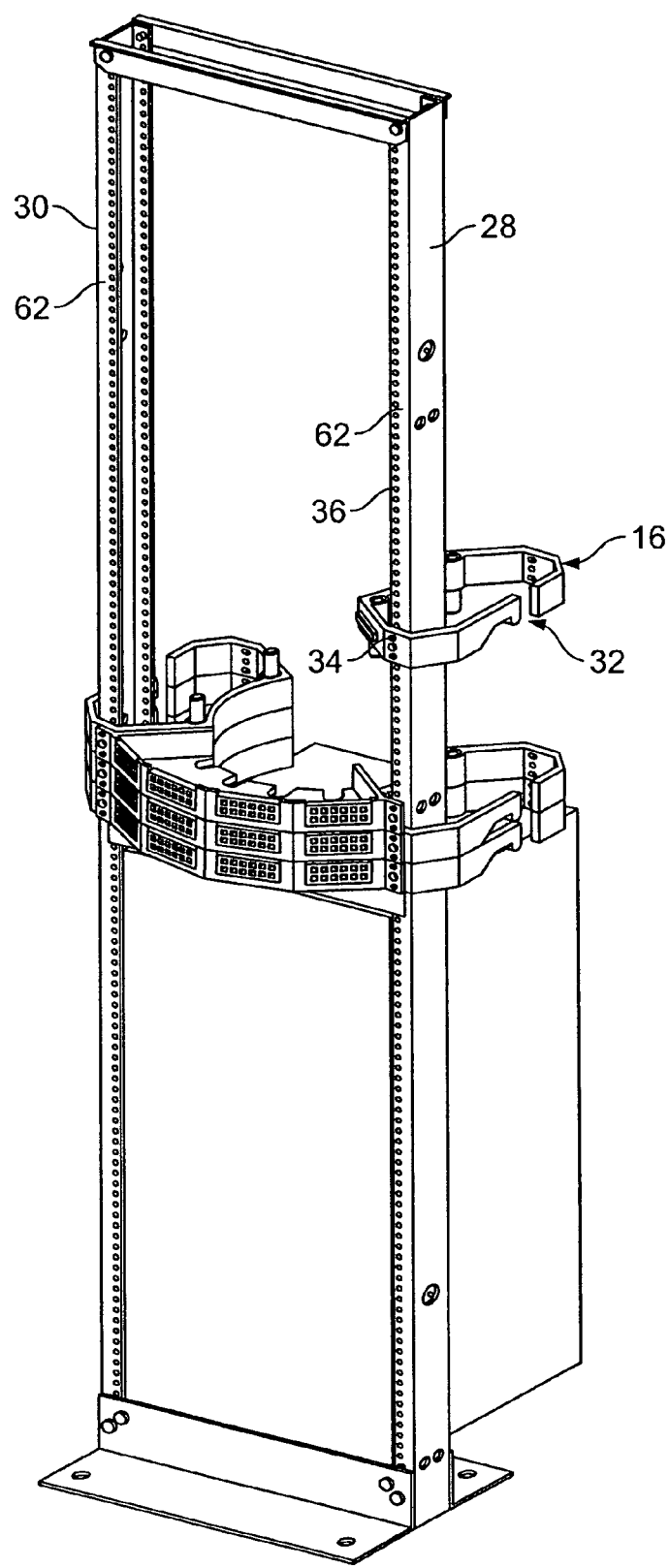
FIG. 2 illustrates an isometric view of the cable management system of FIG. 1 with several patch panels and wire managers removed.

FIG. 2 illustrates the cable management system 10 with a majority of the patch panels 14 and wire managers 16 removed. Each wire manager 16 includes an opening 32 there through which permits the wire managers 16 to be loaded onto corresponding support brackets 28 or 30. Once each wire manager 16 is loaded onto the corresponding support bracket 28 or 30, the wire manager 16 is secured to the corresponding support bracket 28 or 30 through any of several conventional fastening means, such as bolts, screws, welding, adhesive, hooks and the like. In the exemplary embodiment of FIG. 2, a series of holes 34 are provided though each wire manager 16 which align with holes 36 in the corresponding support bracket 28 or 30. Pins or bolts are inserted through the holes 34 and 36 to achieve a secure connection.

Figure 3:
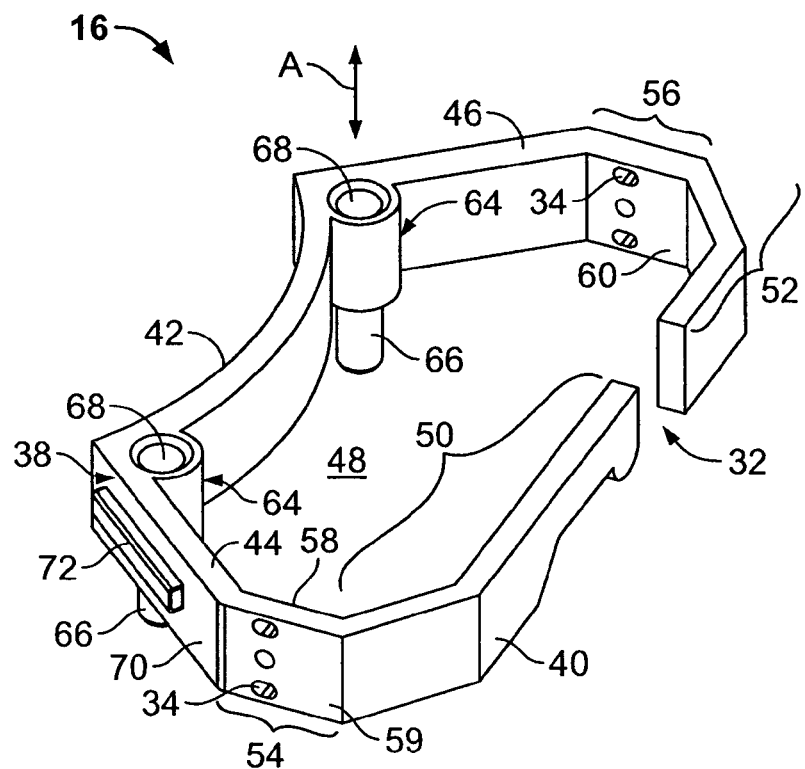
FIG. 3 illustrates an isometric view of a wire manager formed in accordance with an embodiment of the present invention.

FIG. 3 illustrates an individual wire manager 16 in more detail. The wire manager 16 includes a body 38 that is constructed with a generally curved geometry or contour. More specifically, the body 38 includes a front wall 40, a back wall 42 and side walls 44 and 46. The front, back and side walls 40, 42, 44 and 46 surround a cavity 48 having a curved interior contour. The cavities 48 of a wire management module 18 or 20 define a vertical wire guide. The curved interior of the cavity 48 may take many shapes other than the shape illustrated in FIG. 3. In FIG. 3, the cavity 48 is shown with a semi-circular geometry, however it is understood that the interior contour is not limited to semi-circular. Instead, the geometry of the interior contour may resemble a circle, an oval, a triangle, an S-shape, a wave shape, a polygon (other than a square or rectangle, such as a pentagon, an octagon and the like) or any other non-square or non-rectangular shape. Optionally, the front walls 40 of the wire managers 16 may be shaped as N-sided polygons where N is two or greater. As N approaches a large number, the surface described resembles a cylindrical or ellipsoidal section.

In the example of FIG. 3, the back wall 42 is convex bowing into the cavity 48, while the front, back and side walls 40, 42, 44 and 46 are formed integral with one another. Optionally, the wire manager 16 may be formed from multiple separate discrete pieces that are joined with one another in a variety of manners, such as screws, hooks, soldering, welding, mortise and tenon and the like. Optionally, the wire manager 16 may be constructed in two or more separate components that are not fully joined with one another, but instead are separately mounted to the frame 12. The front wall 40 includes an opening 32, through which cables are inserted. Optionally, the opening 32 may be closable with a closure member, such as a hinged door which a latch that shuts to enclose fully cavity 48.

In the example of FIG. 3, the front wall 40 is divided at opening 32 into first and second segments 50 and 52 that are formed integrally with the corresponding side walls 44 and 46 via bracket segments 54 and 56, respectively. Optionally, the wire manager 16 may be configured to permit segments 50 and 52 to close opening 32 and secure to one another. The bracket segments 54 and 56 include inner surfaces 58 and 60 configured to flushly abut against the front surface 62 (FIG. 2) of a corresponding support bracket 28 or 30. The holes 34 in the bracket segments 54 and 56 are shown in more detail in FIG. 3. The side walls 44 and 46 of the wire manager 16 flare outward from one another as the side walls 44 and 46 extend from the back wall 42 towards the front wall 40.

The wire manager 16 also includes manager interconnects 64 which are formed at the intersections of the back wall 42 and side walls 44 and 46. The manager interconnects 64 include mounting posts 66 that project in a direction (generally denoted by arrow A) outward transversely from the plane generally containing the body 38 of the wire manager 16. The manager interconnects 64 also include post receptacles 68 aligned transversely to the plane of the body 38, but opening in a direction opposite to that of the mounting post 66. The post receptacles 68 are configured to mate with adjoining mounting posts 66 when wire managers 16 are stacked upon one another (as shown in FIGS. 1 and 2). Optionally, the manager interconnects 64 may be entirely removed or provided at different positions along the body 38. Further, only a single or more than two manager interconnects 64 may be used. As a further alternative, the manager interconnects 64 may be alternated, such that the mounting posts 66 upon a pair of manager interconnects 64 on a single wire manager 16 face in opposite directions, as well as the corresponding post receptacles 68.

The side walls 44 and 46 include outer surfaces 70 having rails 72 formed thereon and extending outward therefrom. Each rail extends along the length of the corresponding side wall 44 or 46 and is configured to be received in a corresponding slot in a patch panel 14 (FIG. 1) when joined. Optionally, the rails 72 may be of different dimensions to provide a keying feature, such as a dovetail, to ensure proper orientation and alignment of corresponding patch panel 14.

Figure 4:
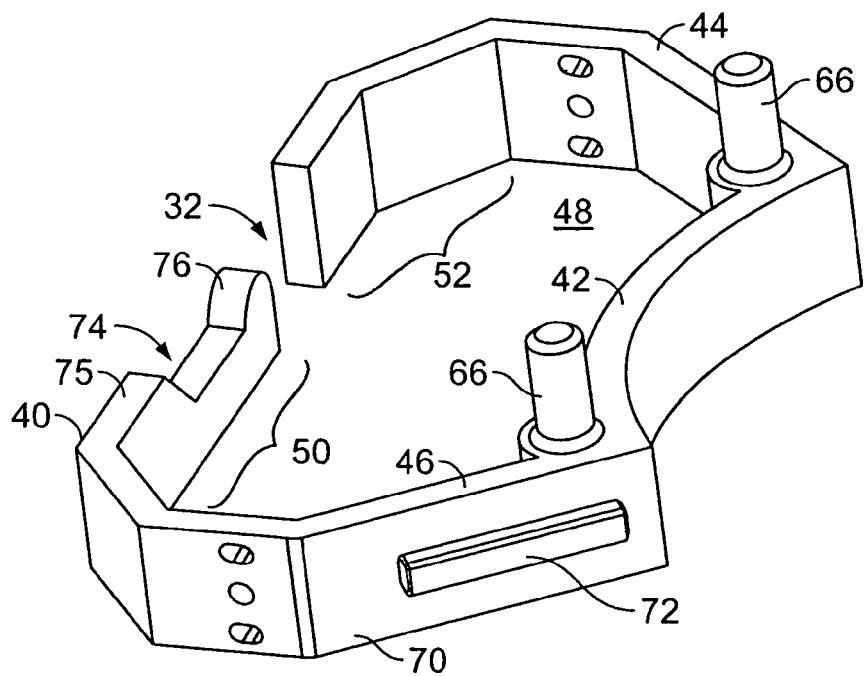
FIG. 4 illustrates a reversed isometric view of the wire manager of FIG. 3 formed in accordance with an embodiment of the present invention.

FIG. 4 illustrates the wire manager 16 turned in the opposite direction to better illustrate the mounting posts 66 and the contour of the front wall 40. More specifically, the front wall 40 includes a notched-out section 74 formed in the edge 75 of segment 50. The outer end of the notched-out section 74 includes a ridge 76. The notched-out section 74 permits a desired subset of cables to enter/exit the wire manager 16 at a desired vertical position along the height of the wire manager module 18 or 20 (FIG. 1). The ridge 76 prevents the cables from moving into the opening 32.

Figure 5:
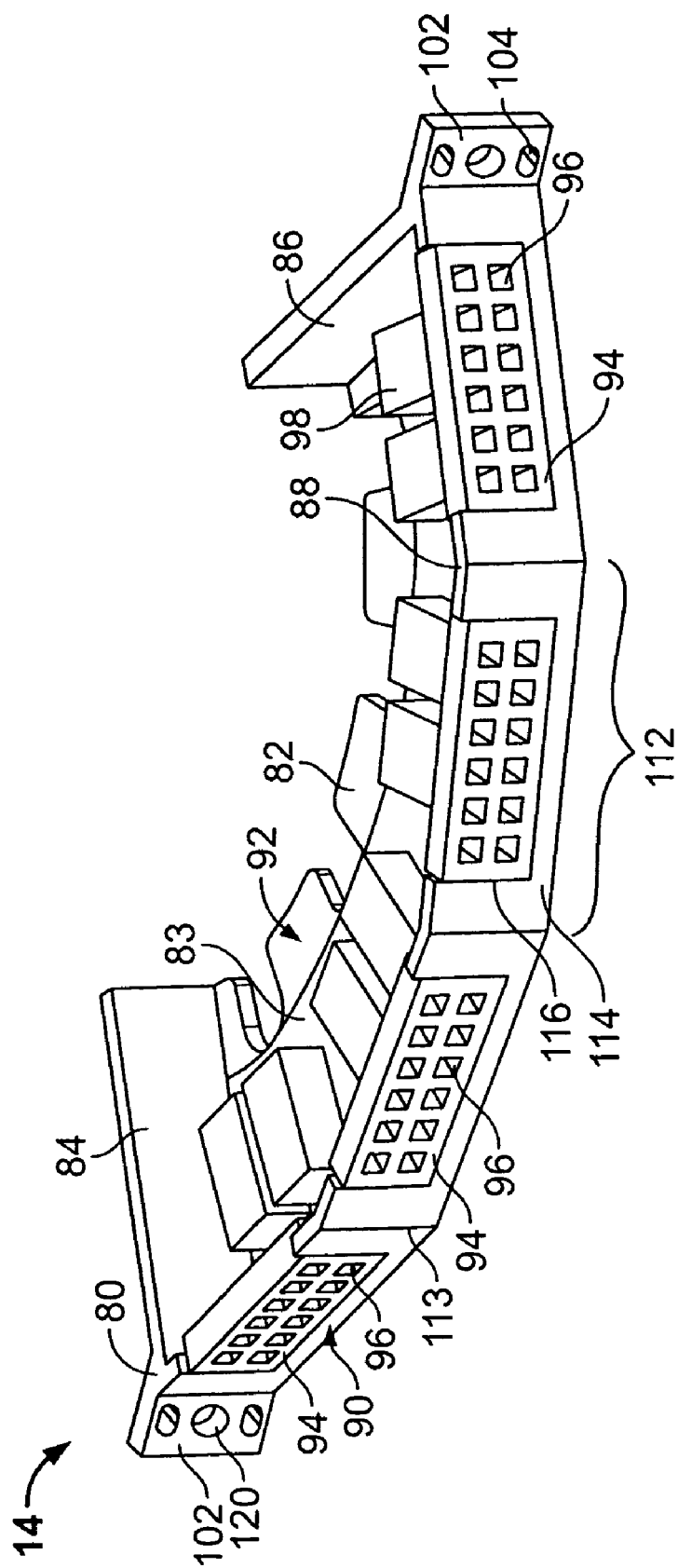
FIG. 5 illustrates a front isometric view of a patch panel formed in accordance with an embodiment of the present invention.

FIG. 5 illustrates a more detailed view of a patch panel 14. The patch panel 14 includes a body 80 comprised of a base 82, side walls 84 and 86 and a front face 88. The patch panel 14 generally includes front and rear connectivity interfaces 90 and 92, respectively. The front connectivity interface 90 includes multiple connector modules 94, each of which includes an array or matrix of openings that hold receptacle jacks or ports 96. In the example of FIG. 5, each connector module 94 contains twelve receptacle jacks 96 arranged in a 2×6 matrix.

Optionally, the number of receptacle jacks 96 may be varied as may the dimensions of the matrix. For instance, each connector module 94 may hold a single row of discrete or grouped receptacle jacks 96 or may hold receptacle jacks 96 arranged in 2×2, 3×2, 3×3, 4×3 matrices and the like. As a further option, the jack configuration of different connector modules 94 in the front connectivity interface 90 may be varied. For example, the receptacle jacks 96 may constitute RJ45 connectors, optical connectors, power connectors and the like. However, many other types of connectors may be substituted and utilized. In the example of FIG. 5, each receptacle jack 96 receives a connector plug and cable that conveys a single stream of information, such as associated with a single source or destination. As an example, a single stream of information may be from one user station. At this point, power distribution, optical signal combining, distribution, or amplification, signal indication (such as with LEDs) and optical or electrical signal conditioning may be added.

The patch panel 14 includes one or more circuit boards 83 mounted on the base 82. The circuit board 83 is generally semi-circular in shape to follow the curvature of the base 82. The circuit board 83 includes conductive signal paths provided thereon, such as traces or in a lead frame. The traces interconnect individual contacts within each connector module 94 with a corresponding multiport connector 98 which is mounted on the circuit board 83. The patch panel 14 includes multiple multiport connectors 98 mounted on the circuit board 83. The multiport connectors 98 each include a receptacle 100 (FIG. 6) which is configured to receive a multiport plug and cable that convey multiple independent data streams. In the exemplary embodiment, the receptacle jacks 96 on the front connectivity interface 90 are each associated with a single or sub-set of data streams and/or power feeds, a group of which are collected within an associated multiport connector 98. Optionally, the power feed may be maintain as a separate path independently of the multiport connector 98. The individual data streams from the receptacle jacks 96 are not merged with one another, but instead are grouped at receptacle 100 for a single plug and cable configured to convey multiple independent data streams. Examples of the receptacle 100 are RJ-21, D-Sub-miniature, MPO, SCSI connectors and the like. The multi-port connectors 98 define the rear connectivity interface 92.

Alternately, a wire or optical fiber may be directly terminated to the rear face of the receptacle jacks 96 through means of crimping, soldering, adhesives, insulation displacement termination, splicing, connectorization and the like The body 80 of the patch panel 14 further includes retention tabs 102 formed proximate both side walls 84 and 86. The retention tabs 102 include holes 104 and extend laterally outward at an obtuse angle from the side walls 84 and 86. The retention tabs 102 are configured to fit against the outer surface 59 of a related bracket segment 54 on a corresponding wire manager 16.

Figure 6:
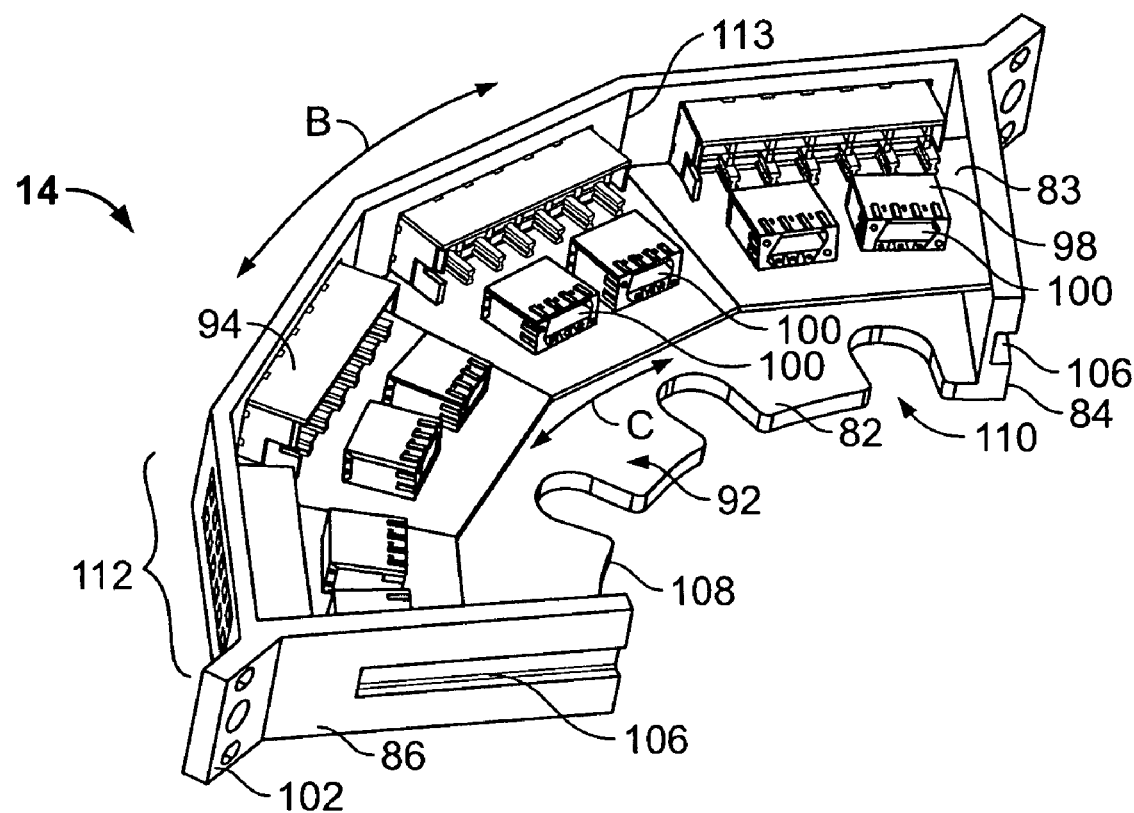
FIG. 6 illustrates a rear isometric view of the patch panel of FIG. 5.

FIG. 6 illustrates a rear view of the patch panel 14 to better illustrate the multiport connectors 98 and the side walls 84. Each side wall 84 includes a slot 106 having an open back end which is configured to fit over corresponding rails 72 (FIG. 3) when the patch panels 14 are loaded onto the cable management system 10. The rear end 108 of the base 82 includes notches 110, within which the cables may rest or be secured once plugged into the receptacles 100 in the multiport connectors 98. As illustrated in FIG. 6, the base 82 formed in a semi-circular arc. Optionally, the circuit board 83 may be rectangular or divided into rectangular or wedge shaped separate boards and may contain fiber optic components. For example, a multiplexed fiber optic signal may be distributed from a single connector, actively, passively, with fibers or electronically.

Returning to FIG. 5, the front face 88 is formed with multiple sections 112 that have planar front surfaces 114. Each section 112 includes an opening 116 that receives a corresponding connector or connector module 94. The sections 112 are formed integrally with one another at bends 113 in the example of FIG. 5, but may be formed discrete from one another. The front sections 112 intersect at bends 113 at obtuse angles with respect to one another to define collectively an N-sided portion of a polygon. In the example of FIG. 5, four sections 112 are illustrated, however the number of sections 112 may be varied. For example, three sections or more than four sections 112 may be utilized. The sections 112 join along a substantially arcuate path. A comparison of FIGS. 5 and 6 illustrates that the front and rear connectivity interfaces 90 and 92 are arranged along concentric arcuate paths (generally denoted by arrows B and C in FIG. 6). The retention 102 or bracket segment 54 may be hinged for ease of assembly and access.

Figure 7:
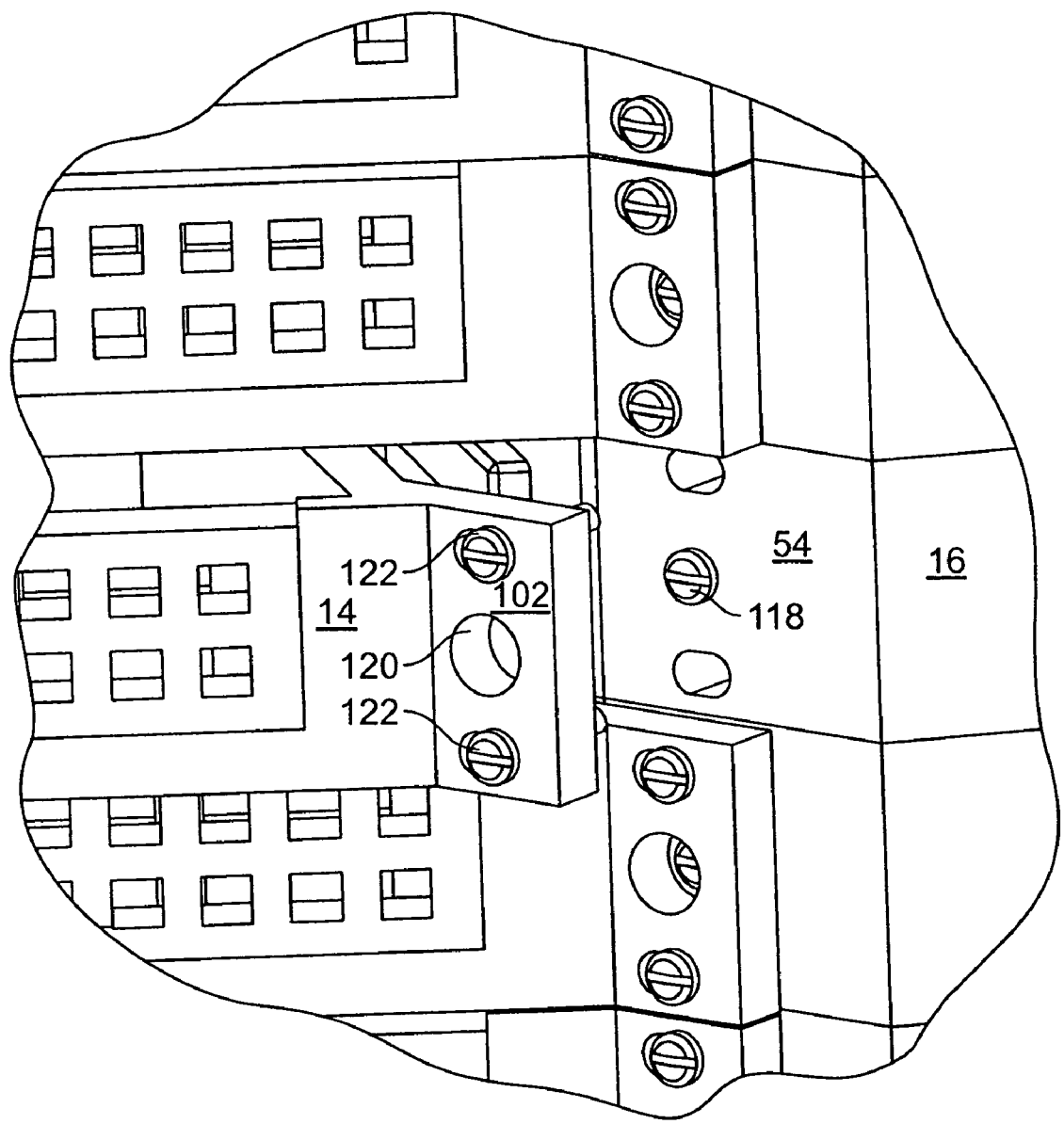
FIG. 7 illustrates an exploded isometric view of the intersection between a patch panel and wire manager.

FIG. 7 illustrates an enlarged view of the interface between a patch panel 14 and a corresponding wire manager 16. As shown in FIG. 7, the wire manager 16 is secured at bracket segment 54 to the frame 12 (not shown in FIG. 7) by a screw 118. Once the wire manager 16 is attached to the frame 12, the patch panel 14 is added such that the retention tab 102 fits over the bracket segment 54. An enlarged hole 120 aligns with a screw 118, while screws 122 secure the patch panel 14 to the frame 12. Optionally, retention tab 102 and/or segment 54 may be hinged.

Figure 8:
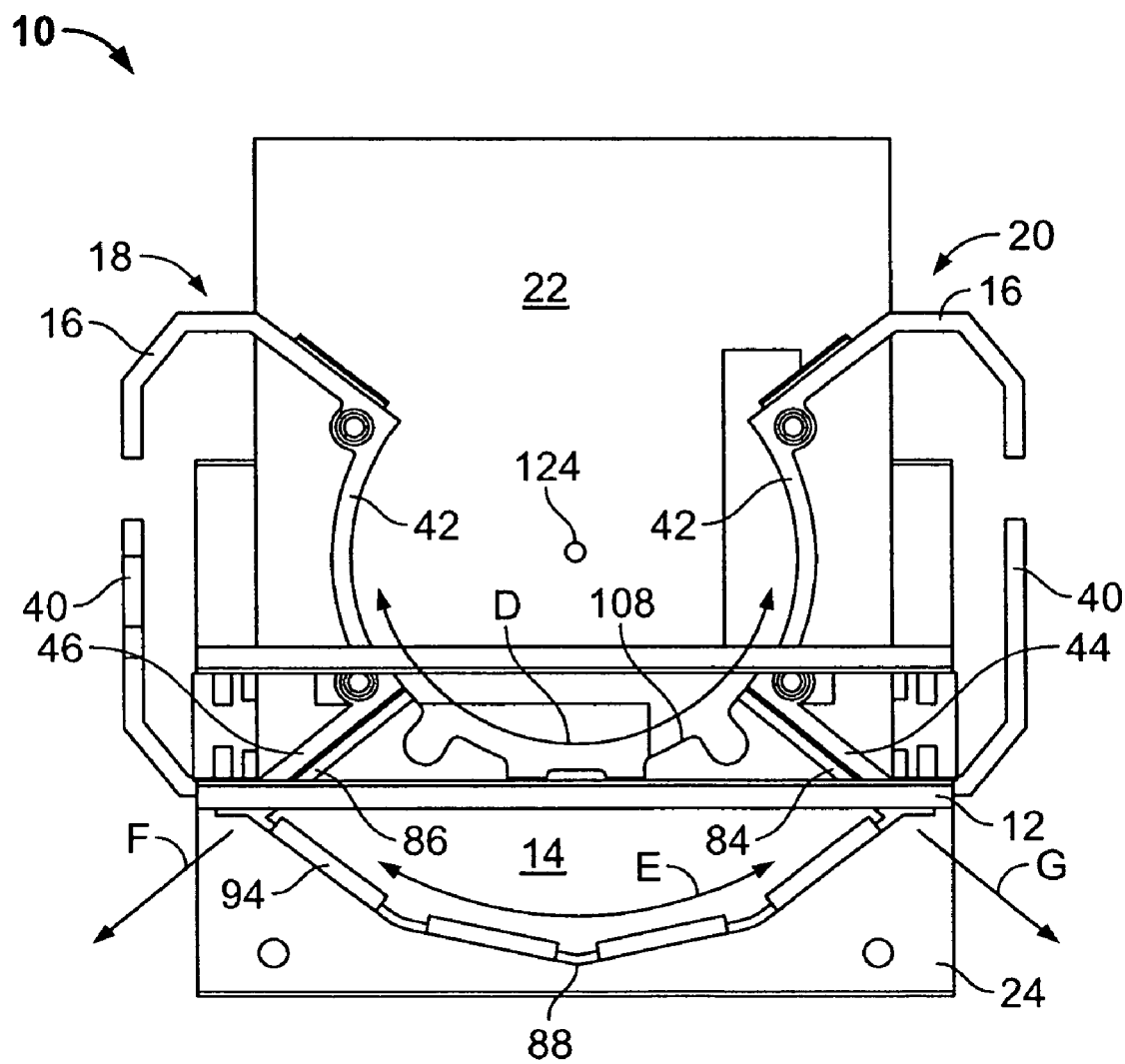
FIG. 8 illustrates a top view of the cable management system of FIG. 1.

FIG. 8 illustrates a top view of the cable management system 10. The switch system 22 is mounted within the frame 12 above the base plate 24. A pair of wire manager modules 18 and 20 are mounted on opposite sides of patch panel 14 to form a C-shaped geometry. Optionally, the frame 12 may be entirely removed and the patch panel 14 and wire manager modules 18 and 20 joined as shown to be free standing independent of and without any need for the frame 12. The C-shaped geometry formed by the wire manager modules 18 and 20 and patch panel 14 affords a very stable footprint that may not necessarily need any additional supporting structure. The patch panel 14 and wire manager modules 18 and 20 extend along common interior and exterior circular arcs as denoted by arrows D and E, respectively. As better shown in FIG. 8, the back walls 42 of the wire managers 16 are bowed convexly along an arc equaling the arc of the rear edge 108 of the base 82 of the patch panel 14.

The patch panel 14 join with each of the wire manager modules 18 and 20 at respective abutting side walls 44 and 46, on the wire managers 16, and 84 and 86 on the patch panel 14. The side walls 44 and 46 of the wire managers 16 and the side walls 84 and 86 of the patch panel 14 are oriented to abut against one another along radial axes generally denoted by arrows F and G which extend outward from a center 124 of the cable management system 10.

Optionally, the patch panel 14 and wire managers 16 may be constructed in other non-orthogonal geometries other than a C-shape. For example, the non-orthogonal geometry may resemble other cylindrical shapes, such as a complete circle, a complete or partial oval, a complete or partial polygon, and the like.

Figure 9:
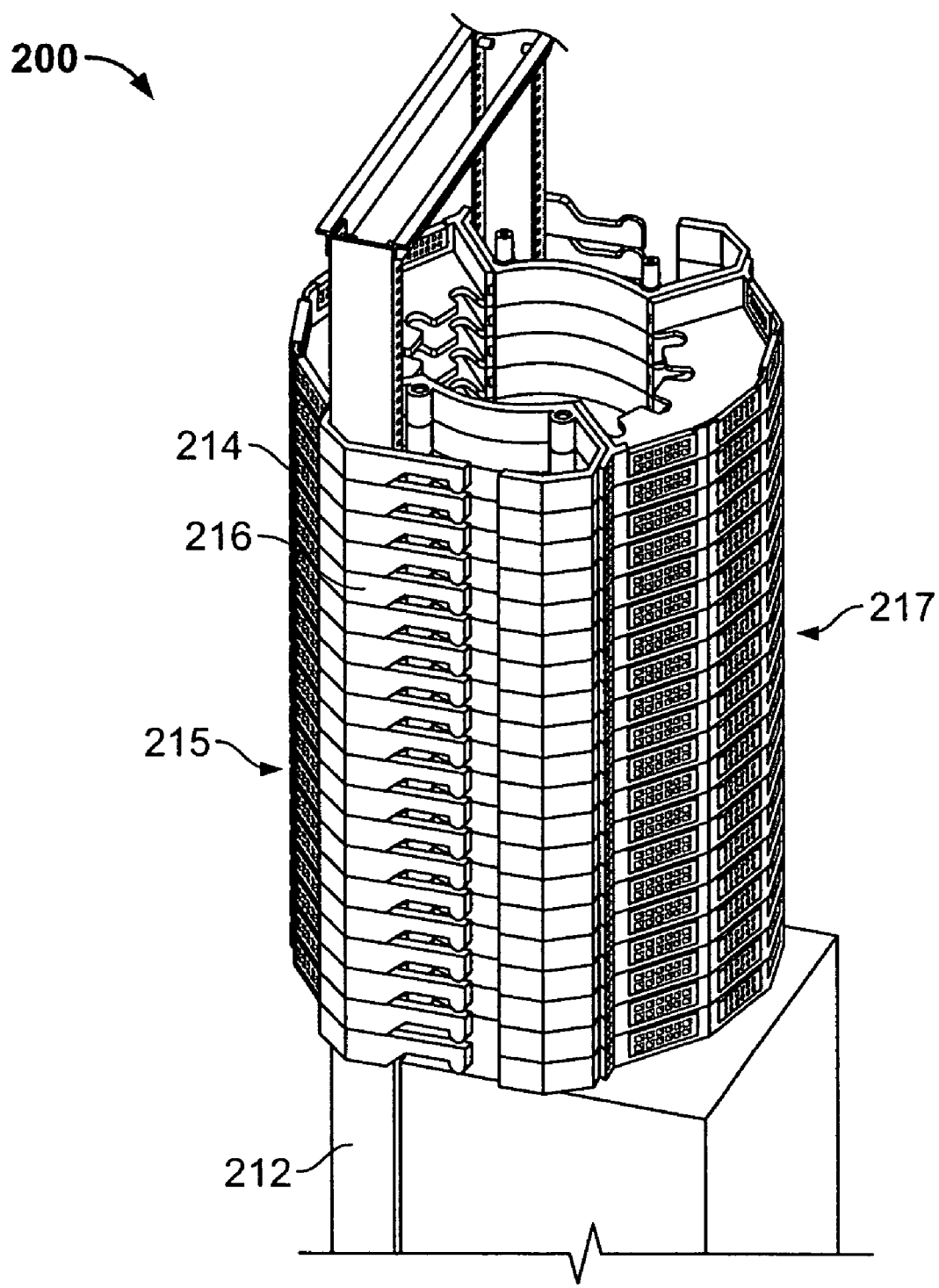
FIG. 9 illustrates a cable management system formed in accordance with an alternative embodiment.

FIG. 9 illustrates an alternative embodiment for a cable management system 200 that includes a frame 212, patch panel 214 and wire managers 216. In the alternative embodiment of FIG. 9, the patch panel 214 have been divided into two separate groups 215 and 217 arranged at the front and back of the cable management system 200. Each of the patch panel 214 in group 215 and in group 217 may be constructed similarly and if so would be interchangeable. By adding the group 217, the overall interconnectivity of the cable management system 200 is doubled. Optionally, individual or small groups of patch panels 214 and/or wire managers 216 may be replaced by spaces to facilitate access to the inner cavity or rear of the patch panels 214.

While the overall geometry of the cable management system 200 resembles a complete cylinder, alternative non-orthogonal geometry's may be utilized. For example, the size and curvature of the patch panel 214 may be increased to form a more oval shape with longer arcuate connectivity interfaces on the exterior of the patch panel 214 in each of groups 215 and 217.

Figure 10:
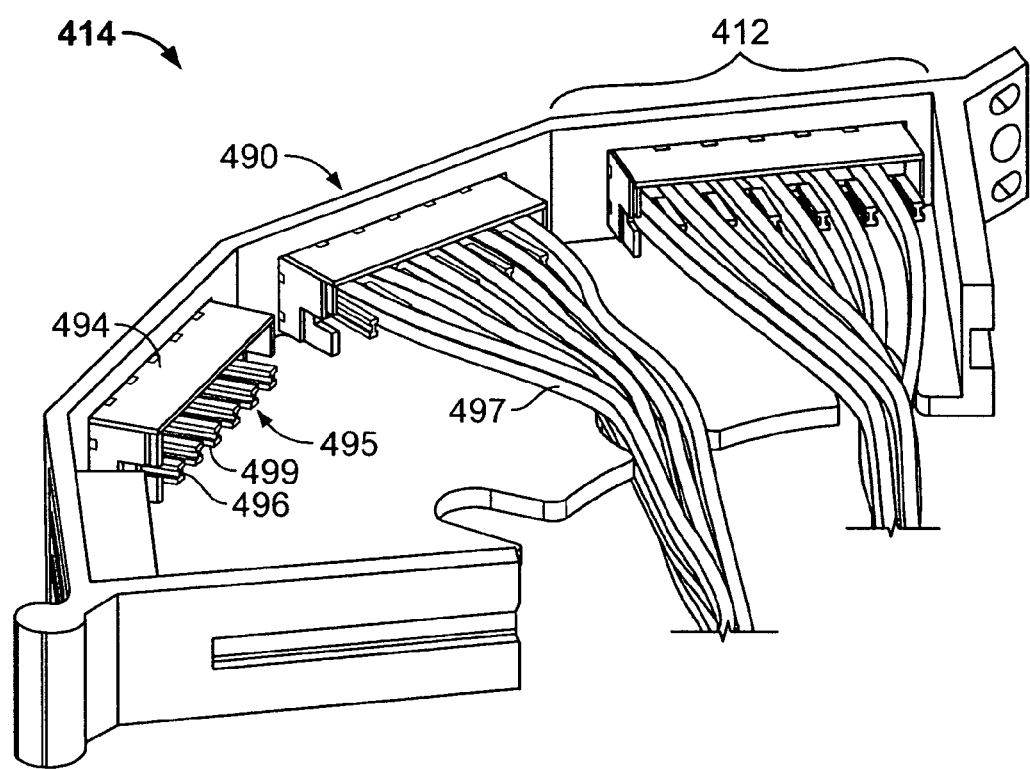
FIG. 10 illustrates a patch panel having connector modules that directly connect to cables in accordance with an alternative embodiment.

FIG. 10 illustrates a patch panel 414 formed in accordance with an alternative embodiment. The patch panel 414 includes a front connectivity interface 490 comprised of multiple sections 412. Each section 412 includes a connector module 494 comprised of an array of receptacle jacks 496. The rear face 495 of the connector module 494 is configured to be directly terminated to cables 497, thereby avoiding the use of a multiport connector as explained above. The cables 497 may be electrical, fiber optic and the like. The cables 497 may be terminated at individual contacts 499 within each receptacle jack 496 through a variety of means, such as crimping, insulation displacement, soldering, and the like.

The foregoing cable management systems may also be retrofit into existing switching networks. To retrofit such structures, the existing rectangular wire managers and planar patch panels may be removed wholly or partially and replaced with patch panels and wire managers having the above described various structures and geometries.

While the invention has been described in terms of various specific embodiments, those skilled in the art will recognize that the invention can be practiced with modification within the spirit and scope of the claims.

What is claimed is:

1. A patch panel system, comprising:
   a frame;
   a patch panel attachable to said frame, said patch panel including a first connectivity interface having multiple connector receiving sections extending along a substantially arcuate path and joined to form an N-sided portion of a non-closed polygon where N is greater than two, said patch panel including a wedge shaped body with opposed front and back walls, at least one of said front and back walls being generally arcuately shaped; and
   connector ports provided on at least two adjacent sections of said first connectivity interface.

2. The patch panel system of claim 1, wherein said multiple sections of said first connectivity interface have planar front surfaces that are oriented at obtuse angles to one another along a substantially arcuate path.

3. The patch panel system of claim 1, wherein at least one of said connector ports includes a rear face configured to be directly connected to a cable.

4. The patch panel system of claim 1, wherein at least one of said connector ports is configured to convey a single data stream associated with a single information source or destination.

5. The patch panel system of claim 1, wherein said patch panel includes a second connectivity interface including at least one multi-port connector port communicatively interconnected with a plurality of said connector ports at said first connectivity interface.

6. The patch panel system of claim 1, further comprising a multi-port connector provided in a second connectivity interface, said multi-port connector conveying multiple independent data streams associated with multiple independent information sources or destinations.

7. The patch panel system of claim 1, further comprising a circuit board in said patch panel, said circuit board including at least one of a communications path and a power distribution path individually joined to said connector ports.

8. The patch panel system of claim 1, wherein said patch panel further includes a second connectivity interface, said first and second connectivity interfaces extending along generally concentric arcuate paths.

9. The patch panel system of claim 1, wherein said patch panel includes a latch tab thereon extending outward from said first connectivity interface, said latch tab being one of securely and hingeably attached to said frame.

10. The patch panel system of claim 1, further comprising a plurality of said patch panels arranged adjacent one another in a stacked manner.

11. The patch panel system of claim 1, wherein said connector ports are provided on immediately adjacent sections of said multiple sections of said first connectivity interface.

12. The patch panel system of claim 1, wherein said multiple sections are joined at edges.

13. A patch panel, comprising:
    a body;
    a first connectivity interface provided on said body, said first connectivity interface having multiple sections extending along a substantially arcuate path and joined to form an N-sided portion of a polygon where N is greater than two; and
    connector ports provided on at least two immediately adjacent sections of said multiple sections of said first connectivity interface, said connector ports provided at said first connectivity interface arranged into connector modules, each of said connector ports in a first connector module being communicatively coupled to a single common multi-data stream connector port provided at a second connectivity interface of said patch panel.

14. The patch panel of claim 13, wherein said multiple sections of said first connectivity interface are planar and oriented at obtuse angles to one another along a substantially arcuate path.

15. The patch panel of claim 13, wherein at least one of said connector ports includes a rear face configured to be directly connected to a cable.

16. The patch panel of claim 13, wherein said connector ports are provided on at least three of said multiple sections of said first connectivity interface.

17. A patch panel, comprising:
    a body having a front, wall and a back wall extending between opposed side walls, said front, back and side walls defining a wedge shape, at least one of said front and back walls being generally arcuately shaped;
    a first connectivity interface provided on said body, said front wall defining said first connectivity interface, said first connectivity interface having multiple sections extending along a substantially arcuate path and joined to form an N-sided portion of a polygon where N is greater than two; and
    connector ports provided on at least two of said multiple sections of said first connectivity interface.

18. The patch panel system of claim 17, wherein said connector ports are provided on immediately adjacent sections of said multiple sections of said first connectivity interface.

19. The patch panel system of claim 17, wherein said multiple sections are joined at edges.

20. A patch panel, comprising:
    a body;
    a first connectivity interface provided on said body, said first connectivity interface having multiple sections extending along a substantially arcuate path and joined to form an N-sided portion of a polygon where N is greater than two;

connector ports provided on at least two of said multiple sections of said first connectivity interface; and a multi-port connector provided in a second connectivity interface of said patch panel, said multi-port connector conveying multiple independent data streams associated with multiple independent users.

21. The patch panel of claim 13, further comprising a circuit board in said patch panel, said circuit board including at least one of a communications path and a power distribution path individually joined to said connector ports.

22. The patch panel of claim 13, wherein multiple patch panel are stacked on one another.

23. The patch panel of claim 13, wherein said multiple sections of said first connectivity interface are planar and each hold a plurality of connector ports groups into an array.

24. The patch panel of claim 20, wherein said connector ports are provided on immediately adjacent sections of said multiple sections of said first connectivity interface.

* * * * *